US012648641B2

(12) United States Patent
Chen et al.

(10) Patent No.: US 12,648,641 B2
(45) Date of Patent: Jun. 9, 2026

(54) SLIDE RAIL ASSEMBLY

(71) Applicants: KING SLIDE WORKS CO., LTD.,
Kaohsiung City (TW); KING SLIDE TECHNOLOGY CO., LTD.,
Kaohsiung City (TW)

(72) Inventors: Ken-Ching Chen, Kaohsiung City
(TW); Shun-Ho Yang, Kaohsiung City
(TW); Tzu-Cheng Weng, Kaohsiung
City (TW); Chun-Chiang Wang,
Kaohsiung City (TW)

(73) Assignees: KING SLIDE WORKS CO., LTD.,
Kaohsiung City (TW); KING SLIDE TECHNOLOGY CO., LTD.,
Kaohsiung City (TW)

( * ) Notice: Subject to any disclaimer, the term of this
patent is extended or adjusted under 35
U.S.C. 154(b) by 85 days.

(21) Appl. No.: 18/826,211

(22) Filed: Sep. 6, 2024

(65) Prior Publication Data

US 2025/0325105 A1     Oct. 23, 2025

(30) Foreign Application Priority Data

Apr. 19, 2024    (TW) ................................. 113114925

(51) Int. Cl.
*A47B 88/423* (2017.01)
*A47B 88/407* (2017.01)
(Continued)

(52) U.S. Cl.
CPC .......... *A47B 88/487* (2017.01); *A47B 88/407*
(2017.01); *A47B 88/423* (2017.01);
(Continued)

(58) Field of Classification Search
CPC ... A47B 88/487; A47B 88/423; A47B 88/493;
A47B 88/407; A47B 2210/0059; A47B
2210/0032
See application file for complete search history.

(56) References Cited

U.S. PATENT DOCUMENTS 6,851,773 B2    2/2005 Chen
7,648,214 B2    1/2010 Chen
(Continued)

FOREIGN PATENT DOCUMENTS

EP          4 349 220 A1    4/2024
JP          2021-79074      5/2021
(Continued)

*Primary Examiner* — Kimberley S Wright
(74) *Attorney, Agent, or Firm* — Winston Hsu

(57) ABSTRACT

A slide rail assembly is provided and includes a first rail, a
second rail, an aiding-slide device, an auxiliary member and
a retaining member. The second rail is movably mounted on
a channel of the first rail. The aiding-slide device is movably
mounted between the first rail and the second rail. The
auxiliary member is connected to the aiding-slide device and
includes an engaging feature. The retaining member is
arranged on the first rail and includes a resilient portion
having a predetermined feature. The auxiliary member and
the aiding-slide device are made of a first material and a
second material, respectively. When the second rail is
detached from the first rail by displacing relative to the first
rail along an opening direction, the aiding-slide device is
located at a predetermined position by an engagement of the
engaging feature and the predetermined feature.

17 Claims, 12 Drawing Sheets

(51) Int. Cl.
    *A47B 88/487*          (2017.01)
    *A47B 88/493*          (2017.01)
    *F16C 29/04*           (2006.01)

(52) U.S. Cl.
    CPC ..... *A47B 88/493* (2017.01); *A47B 2210/0032*
        (2013.01); *A47B 2210/004* (2013.01); *A47B*
        *2210/0059* (2013.01); *F16C 29/04* (2013.01)

(56)                References Cited

U.S. PATENT DOCUMENTS

| | | | | | |
|---|---|---|---|---|---|
| 9,279,451 | B2 | 3/2016 | Judge | | |
| 10,743,658 | B1 * | 8/2020 | Chen | .................... | A47B 88/447 |
| 2001/0035704 | A1 * | 11/2001 | Dierbeck | ............. | F16C 29/048 |
| | | | | | 384/19 |
| 2002/0081887 | A1 * | 6/2002 | Judge | .................. | H05K 7/1489 |
| | | | | | 439/348 |

| | | | | | |
|---|---|---|---|---|---|
| 2004/0207301 | A1 * | 10/2004 | Chen | .................... | A47B 88/493 |
| | | | | | 312/334.44 |
| 2006/0244349 | A1 * | 11/2006 | Chen | .................... | A47B 88/493 |
| | | | | | 312/334.47 |
| 2007/0040485 | A1 * | 2/2007 | Tseng | ................... | A47B 88/493 |
| | | | | | 312/334.44 |
| 2008/0150409 | A1 * | 6/2008 | Huang | ................. | A47B 88/487 |
| | | | | | 312/334.46 |
| 2014/0185967 | A1 | 7/2014 | Chang | | |
| 2017/0159710 | A1 * | 6/2017 | Chen | .................... | A47B 88/487 |
| 2020/0077793 | A1 * | 3/2020 | Chen | .................... | H05K 7/1489 |
| 2021/0007480 | A1 * | 1/2021 | Chen | ...................... | F16C 29/04 |
| 2021/0145173 | A1 * | 5/2021 | Chen | .................... | H05K 7/1489 |
| 2021/0145174 | A1 * | 5/2021 | Chen | .................... | A47B 88/443 |
| 2024/0122342 | A1 * | 4/2024 | Chen | ..................... | A47B 88/44 |

FOREIGN PATENT DOCUMENTS

| | | | | |
|---|---|---|---|---|
| JP | 2024-55746 A | | 4/2024 | |
| KR | 20070076752 A | * | 7/2007 | .......... A47B 88/487 |

* cited by examiner

SLIDE RAIL ASSEMBLY

BACKGROUND OF THE INVENTION

1. Field of the Invention

The present invention relates to a slide rail product, and more specifically, to a slide rail assembly with more reliability in operation.

2. Description of the Prior Art

U.S. Pat. No. 6,851,773 B2 discloses an aiding-slide positioning mechanism for a drawer slide. The aiding-slide positioning mechanism includes a first rail, a second rail, an aiding-slide member and a positioning member. The aiding-slide member is movably mounted between the first rail and the second rail. An engaging slot structure is disposed on a front end of the aiding-slide member. An engaging hook is disposed adjacent to a lower side of the engaging slot. The positioning member is disposed adjacent to an entry of a channel of the first rail. When the second rail is detached from the channel of the first rail by displacing along an opening direction, the positioning member engages with the engaging hook on the aiding-slide member by a resilient hook rod for restraining the aiding-slide member from displacing relative to the first rail, to facilitate supportability and/or stability during an insertion of the second rail into the channel of the first rail from outside of the channel of the first rail.

In U.S. Pat. No. 6,851,773 B2, the engaging hook and the aiding-slide member are integrally formed with each other and made of the same material. However, in order to meet various requirements, it becomes an important topic to provide a slide rail assembly with more reliability in operation.

SUMMARY OF THE INVENTION

It is an objective of the present invention to provide a slide rail assembly with more reliability in operation.

According to an aspect of the present invention, a slide rail assembly includes a first rail, a second rail, an aiding-slide device, an auxiliary member and a retaining member. The first rail includes a channel. The second rail is movably mounted on the channel of the first rail and displaceable relative to the first rail longitudinally. The aiding-slide device is movably mounted between the first rail and the second rail. The auxiliary member is connected to the aiding-slide device. The auxiliary member includes an engaging feature. The retaining member is arranged on the first rail. The retaining member includes a resilient portion, and the resilient portion includes a predetermined feature. The auxiliary member is made of a first material, and the aiding-slide device is made of a second material. When the second rail is detached from the channel of the first rail by displacing relative to the first rail along an opening direction, the aiding-slide device is located at a predetermined position by an engagement of the engaging feature of the auxiliary member and the predetermined feature of the resilient portion of the retaining member.

According to another aspect of the present invention, a slide rail assembly includes a first rail, a second rail, an aiding-slide device, an auxiliary member and a retaining member. The first rail includes a first wall, a second wall and a longitudinal wall connected between the first wall and the second wall of the first rail, and the first wall, the second wall and the longitudinal wall define a channel of the first rail cooperatively. The second rail is movably mounted on the channel of the first rail and displaceable relative to the first rail longitudinally. The aiding-slide device is movably mounted between the first rail and the second rail. The aiding-slide device includes a first surface and a second surface. A transverse distance between the first surface and the longitudinal wall of the first rail is greater than a transverse distance between the second surface and the longitudinal wall of the first rail. The auxiliary member is connected to the aiding-slide device. The auxiliary member includes an engaging feature, a connecting portion and an extending portion. The connecting portion is configured to be connected to the second surface. The extending portion extends from the connecting portion, and the engaging feature is arranged on the extending portion. The retaining member is arranged on the longitudinal wall of the first rail. The retaining member includes a resilient portion, and the resilient portion includes an accommodating structure. The auxiliary member and the aiding-slide device are made of a first material and a second material, respectively. When the second rail is detached from the channel of the first rail by displacing relative to the first rail along an opening direction, the engaging feature of the auxiliary member stretches into the accommodating structure of the resilient portion of the retaining member to restrain the aiding-slide device from displacing relative to the first rail longitudinally.

In summary, the present invention has more reliability in operation of retaining the aiding-slide device at a position relative to the first rail.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is connected to a second device, that connection may be through a direct mechanical connection, or through an indirect mechanical connection via other devices and connections.

Figure 1:
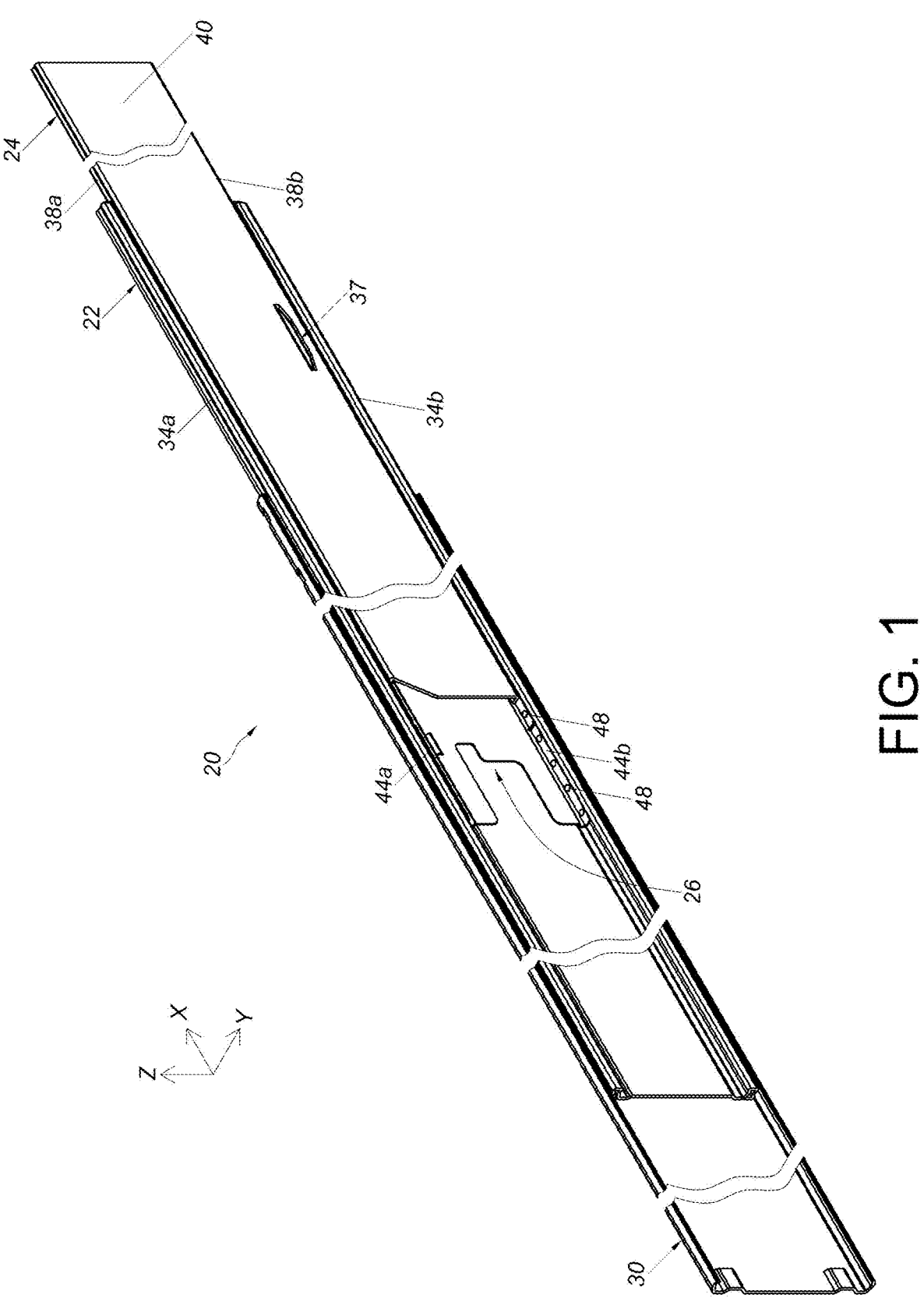
FIG. 1 is schematic diagram of a slide rail assembly according to an embodiment of the present invention.
Figures 2A, 2B:
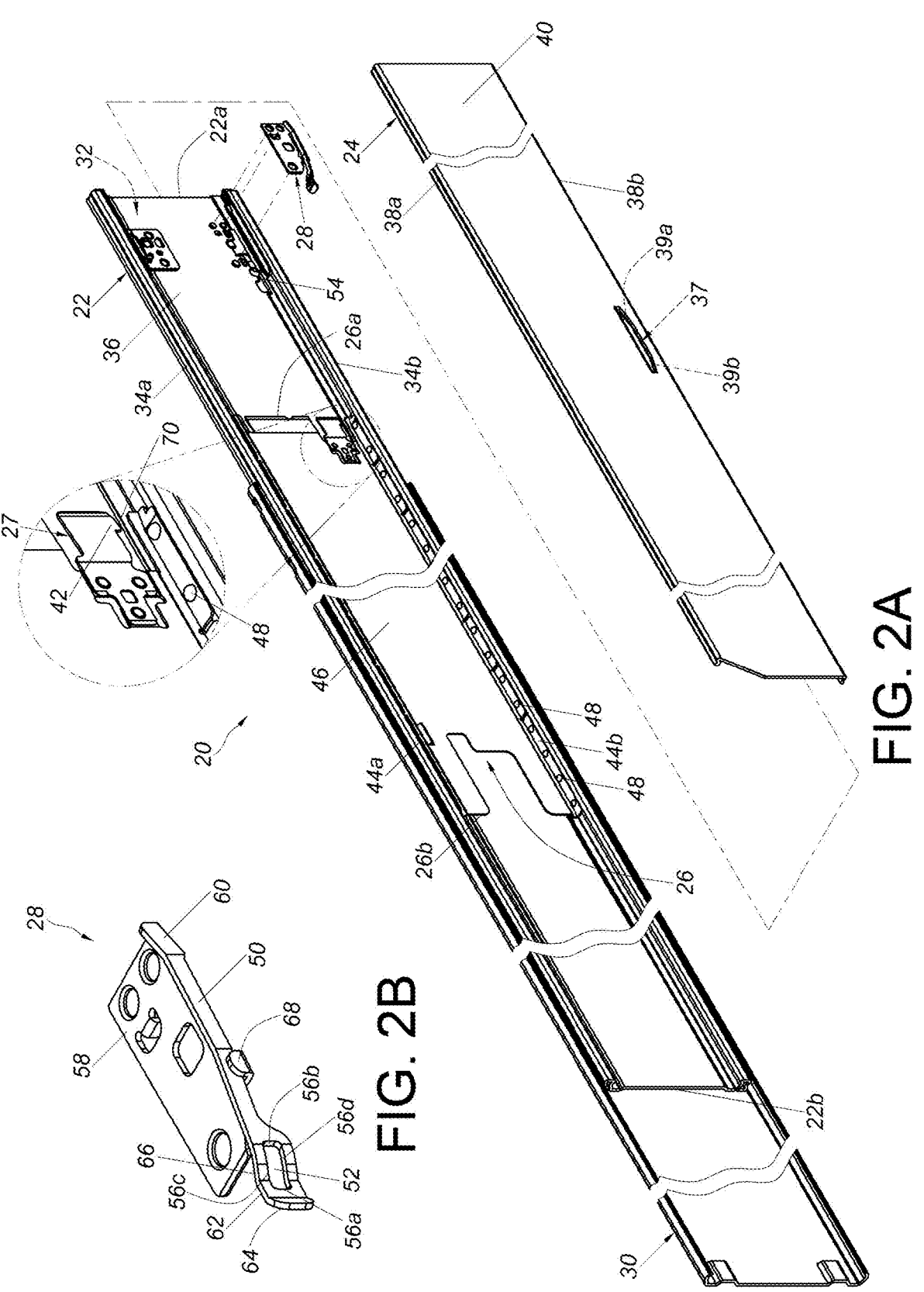
FIG. 2A is an exploded diagram of the slide rail assembly according to the embodiment of the present invention.
FIG. 2B is a diagram of a retaining member according to the embodiment of the present invention.

As shown in FIG. 1 and FIG. 2A, a slide rail assembly 20 includes a first rail 22, a second rail 24, an aiding-slide device 26, an auxiliary member 27 and a retaining member 28. Preferably, the slide rail assembly 20 further includes a third rail 30. The first rail 22 is movably mounted between the third rail 30 and the second rail 24, i.e., the first rail 22, the second rail 24 and the third rail 30 can be a middle rail, an inner rail and an outer rail, respectively. In this embodiment, by way of example, a longitudinal direction can be defined by a length direction of a slide rail, e.g., the first rail 22, the second rail 24, or the third rail 30, and parallel to an X axis. A transverse direction can be defined by a lateral direction or a width direction of the slide rail, e.g., the first rail 22, the second rail 24, or the third rail 30, and parallel to a Y axis. A vertical direction can be defined by a height direction of the slide rail, e.g., the first rail 22, the second rail 24, or the third rail 30, and parallel to a Z axis.

The first rail 22 includes a channel 32. Preferably, the first rail 22 includes a first wall 34a, a second wall 34b and a longitudinal wall 36 connected between the first wall 34a and the second wall 34b of the first rail 22. The first wall 34a, the second wall 34b and the longitudinal wall 36 of the first rail 22 define the channel 32 of the first rail 22 cooperatively. The first rail 22 has a front end 22a and a rear end 22b.

The second rail 24 is movably mounted on the channel 32 of the first rail 22 and displaceable relative to the first rail 22 longitudinally, i.e., along the longitudinal direction. The second rail 24 includes a first wall 38a, a second wall 38b and a longitudinal wall 40 connected between the first wall 38a and the second wall 38b of the second rail 24. The second rail 24 further includes a releasing feature 37. The releasing feature 37 includes a first guiding structure 39a and a second guiding structure 39b. In this embodiment, by way of example, the releasing feature 37 can be a protrusion, and the first guiding structure 39a and the second guiding structure 39b can be inclined surfaces or arc surfaces. However, the present invention is not limited to this embodiment.

The aiding-slide device 26 is movably mounted between the first rail 22 and the second rail 24. Preferably, the aiding-slide device 26 further includes a first portion 44a, a second portion 44b and a longitudinal portion 46 connected between the first portion 44a and the second portion 44b of the aiding-slide device 26. The first portion 44a, the second portion 44b and the longitudinal portion 46 of the aiding-slide device 26 are located at positions corresponding to the first wall 34a, the second wall 34b and the longitudinal wall 36 of the first rail 22, respectively. A plurality of rolling balls 48 are arranged on the first portion 44a and the second portion 44b of the aiding-slide device 26 and configured to support the first wall 34a and the second wall 34b of the first rail 22 and the first wall 38a and the second wall 38b of the second rail 24, for facilitating a smooth displacement of the second rail 24 relative to the first rail 22.

As shown in FIG. 2A to FIG. 4, the auxiliary member 27 is configured to be connected, e.g., fixedly connected, to the aiding-slide device 26. The auxiliary member 27 includes an engaging feature 42. In this embodiment, by way of example, the engaging feature 42 can be an engaging hook. Furthermore, the auxiliary member 27 is made of a first material, and the aiding-slide device 26 is made of a second material different from the first material.

Preferably, the auxiliary member 27 can be a heat treated member, and the first material and the second material can be carbon steel and galvanized steel, respectively. For example, the first material can be SK5 steel, and the second material can be SECC electro-galvanized steel. However, the present invention is not limited to this embodiment.

Preferably, a hardness of the first material is greater than a hardness of the second material.

Preferably, the aiding-slide device 26 has a first end 26a and a second end 26b opposite to the first end 26a. In this embodiment, by way of example, the first end 26a and the second end 26b can be a front end and a rear end. As shown in FIG. 2A, the auxiliary member 27 is connected to the aiding-slide device 26 and located adjacent to the first end 26a of the aiding-slide device 26.

Figures 3A, 3B:
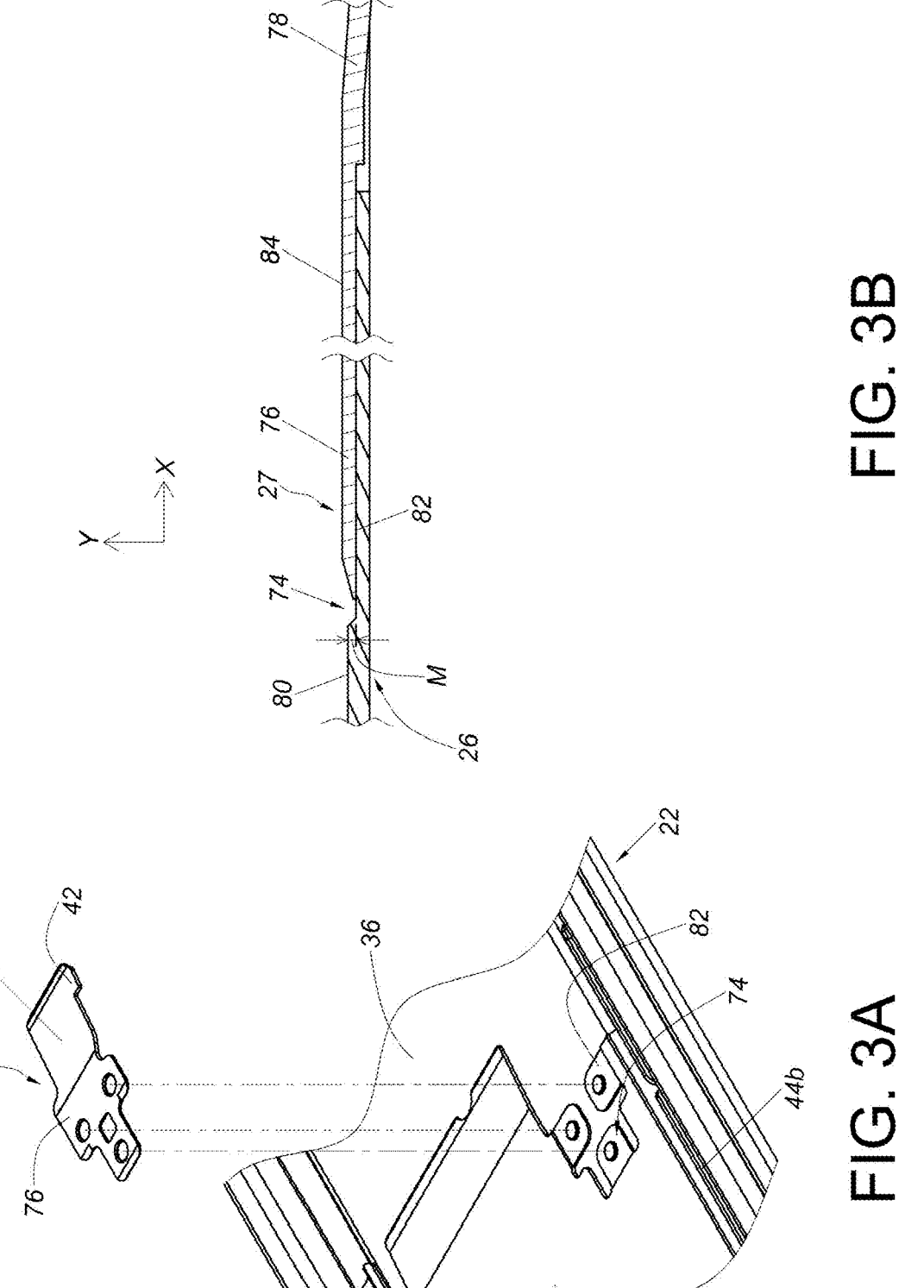
FIG. 3A is a partial enlarged diagram of the slide rail assembly as an auxiliary member is detached from an aiding-slide device according to the embodiment of the present invention.
FIG. 3B is a partial enlarged diagram of the slide rail assembly as the auxiliary member is connected to the aiding-slide device according to the embodiment of the present invention.

Preferably, as shown in FIG. 3A and FIG. 3B, the aiding-slide device 26 further includes a recessed portion 74. The auxiliary member 27 further includes a connecting portion 76 and an extending portion 78. The connecting portion 76 is configured to be connected to the recessed portion 74. The extending portion 78 extends from the connecting portion 76 along the longitudinal direction substantially, and the engaging feature 42 is arranged on the extending portion 78.

Preferably, the aiding-slide device 26 includes a first surface 80 and a second surface 82. In this embodiment, by way of example, the recessed portion 74 includes the second surface 82. As shown in FIG. 3A and FIG. 3B, a transverse distance between the first surface 80 and the longitudinal wall 36 of the first rail 22 is greater than a transverse distance between the second surface 82 and the longitudinal wall 36 of the first rail 22 by a transverse difference M. The connecting portion 76 of the auxiliary member 27 is configured to be connected on the second surface 82, so as to reduce or eliminate a transverse difference between a surface 84 of the auxiliary member 27 and the first surface 80 of the aiding-slide device 26 when the auxiliary member 27 is connected to the aiding-slide device 26.

As shown in FIG. 2A, FIG. 2B, FIG. 4 and FIG. 5, the retaining member 28 is arranged on the longitudinal wall 36 of the first rail 22. The retaining member 28 is located adjacent to the front end 22a of the first rail 22. The retaining member 28 includes a resilient portion 50. In this embodiment, by way of example, the resilient portion 50 can be a resilient arm. However, the present invention is not limited to this embodiment. The resilient portion 50 includes a predetermined feature 52. The longitudinal wall 36 of the first rail 22 includes a restraining feature 54.

Figure 4:
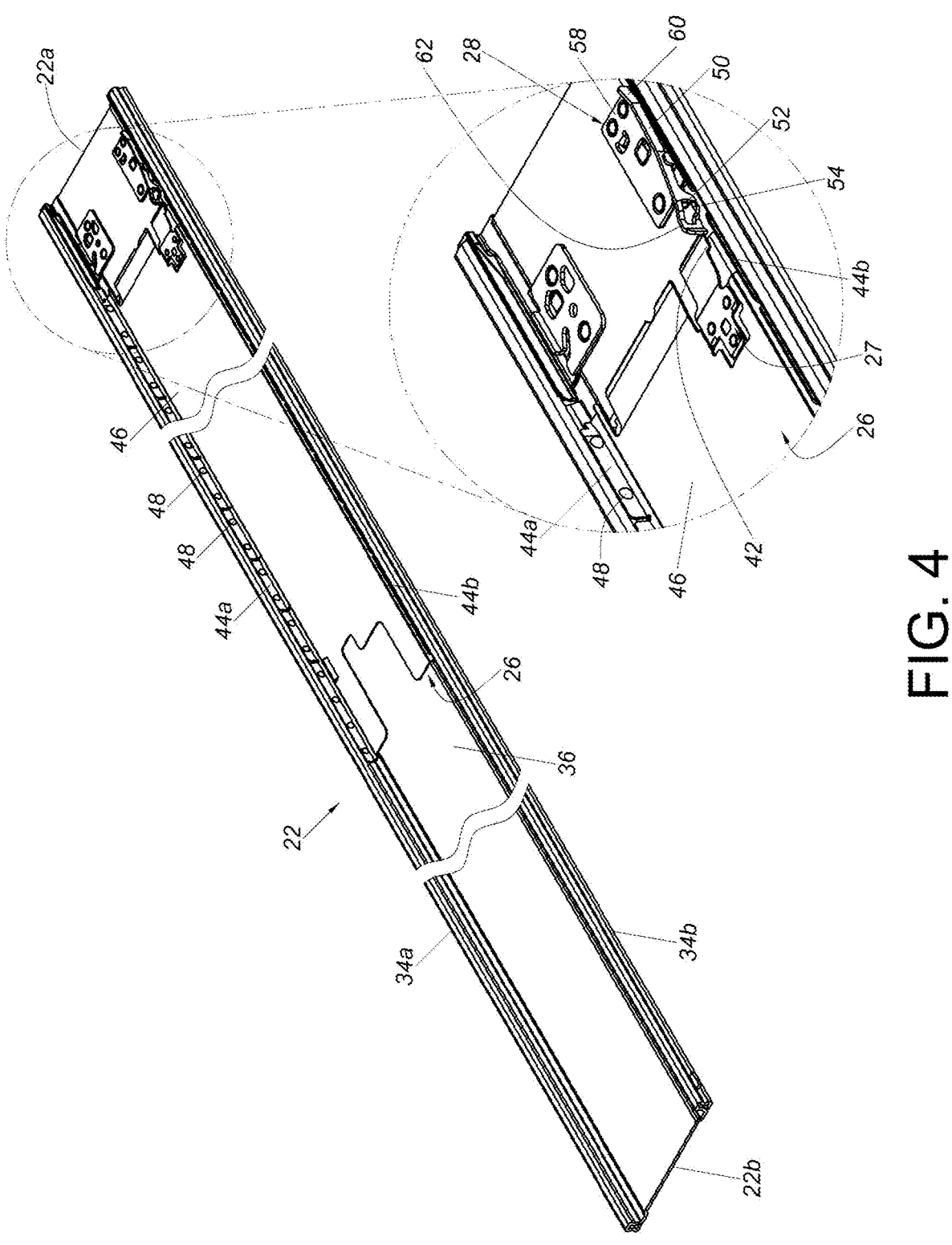
FIG. 4 is a partial diagram of the slide rail assembly according to the embodiment of the present invention.
Figure 5:
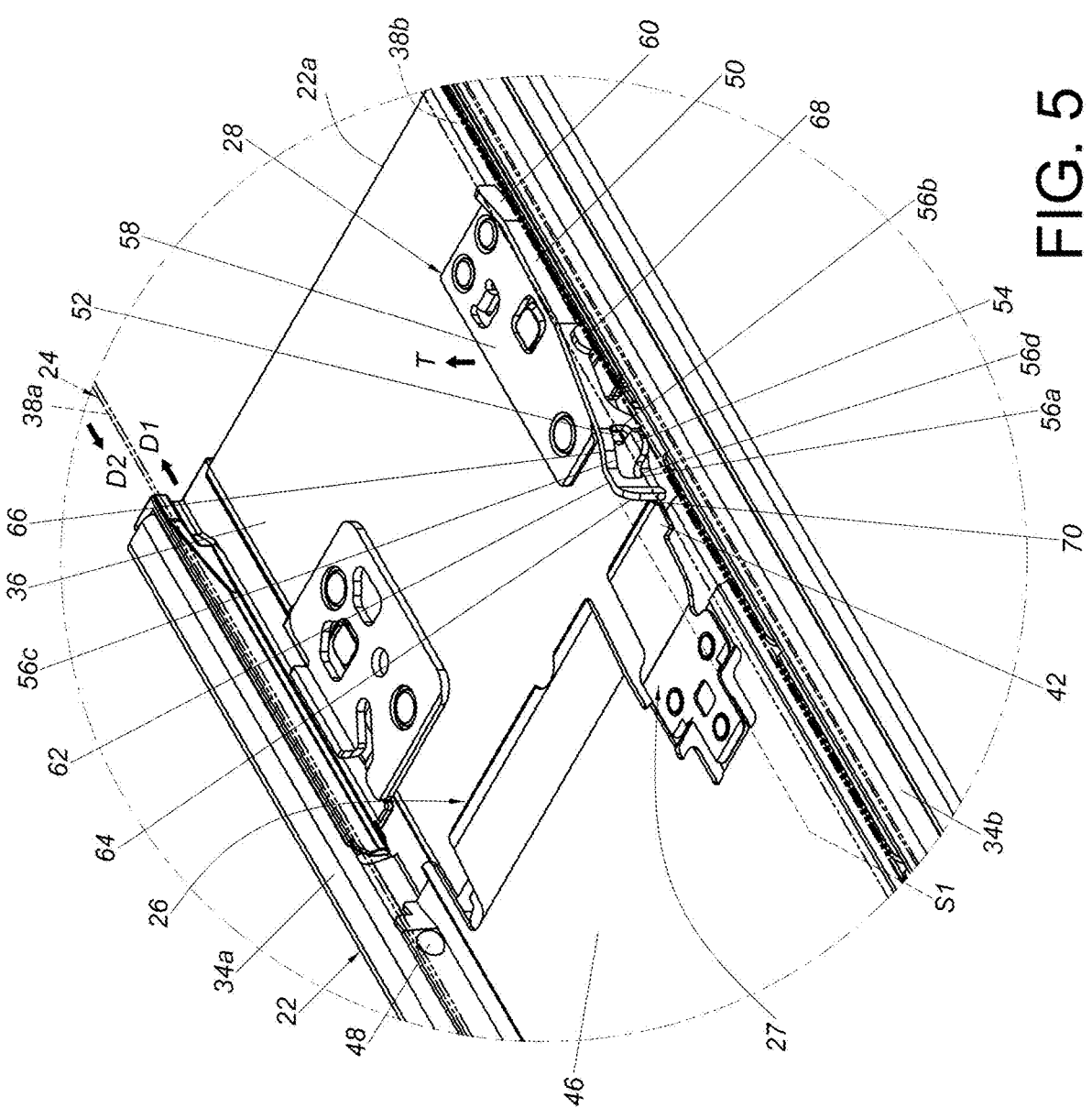
FIG. 5 is a partial diagram of the slide rail assembly as a second rail displaces relative to a first rail along an opening direction according to the embodiment of the present invention.

Preferably, one of the predetermined feature 52 and the restraining feature 54 is an accommodating structure, and the other one of the predetermined feature 52 and the restraining feature 54 is a protrusion configured to stretch into the accommodating structure. As shown in FIG. 4 and FIG. 5, in this embodiment, the predetermined feature 52 can be the accommodating structure, and the restraining feature 54 can be the protrusion configured to stretch into the accommodating structure. However, the present invention is not limited to this embodiment. Preferably, the accommodating structure can be a hole structure defined by a plurality of walls. For example, the resilient portion 50 can include a first hole wall 56a, a second hole wall 56b, a third hole wall 56c and a fourth hole wall 56d for cooperatively defining the accommodating structure with a predetermined contour shape.

Preferably, the retaining member 28 further includes a main body portion 58 connected, e.g., fixedly connected, to the longitudinal wall 36 of the first rail 22. The resilient portion 50 further includes a first end section 60 and a second end section 62. The first end section 60 of the resilient portion 50 is connected to the main body portion 58 of the retaining member 28. The second end section 62 of the resilient portion 50 extends from the first end section 60 of the resilient portion 50 and is resiliently movable relative to the first end section 60 of the resilient portion 50. The predetermined feature 52 is arranged on the second end section 62 of the resilient portion 50.

Preferably, the second end section 62 of the resilient portion 50 includes a first guiding feature 64 and a second guiding feature 66. The predetermined feature 52 is arranged between the first guiding feature 64 and the second guiding feature 66. In this embodiment, by way of example, the first guiding feature 64 and the second guiding feature 66 can be inclined surfaces or arc surfaces.

Preferably, the main body portion 58 of the retaining member 28 includes a supporting section 68 configured to support the resilient portion 50. In this embodiment, by way of example, the supporting section 68 is bent relative to the main body portion 58 and configured to support a bottom part of the resilient portion 50. The supporting section 68 is configured to support the resilient portion 50 for enhancing moving stability of the resilient portion 50. Besides, as shown in FIG. 2B, the resilient portion 50 and the supporting section 68 can be integrally formed with the main body portion 58, such that the retaining member 28 can be a one-piece structure.

As shown in FIG. 5, the engaging feature 42 of the auxiliary member 27 includes a guiding section 70. The guiding section 70 can be an inclined surface or an arc surface. Furthermore, when the auxiliary member 27 is located at a position as shown in FIG. 5, the resilient portion 50 of the retaining member 28 is in a first state S1.

When the second rail 24 displaces relative to the first rail 22 from a retracted position along an opening direction D1 for a predetermined distance, the releasing feature 37 can pass over the resilient portion 50 by an abutment of the first guiding structure 39a of the releasing feature 37 and the first guiding feature 64 of the resilient portion 50, and the aiding-slide device 26 can displace along the opening direction D1 in response to an opening displacement of the second rail 24, so as to drive the guiding section 70 of the engaging feature 42 of the auxiliary member 27 to abut against the first guiding feature 64 of the resilient portion 50 of the retaining member 28.

It should be noticed that if the first guiding feature 64 of the resilient portion 50 receives an excessive force exerted by the first guiding structure 39a of the releasing feature 37 or the guiding section 70 of the engaging feature 42 of the auxiliary member 27 due to a rapid opening displacement of the second rail 24, the restraining feature 54 can prevent the second end section 62 of the resilient portion 50 from deforming, moving, or bending in a specific direction. For example, as shown in FIG. 5, the restraining feature 54 can abut against the fourth hole wall 56d for preventing the second end section 62 of the resilient portion 50 from deforming, moving, or bending in a transverse direction T, and the transverse direction T can be the lateral direction of the first rail 22 along the Y axis.

Figure 6:
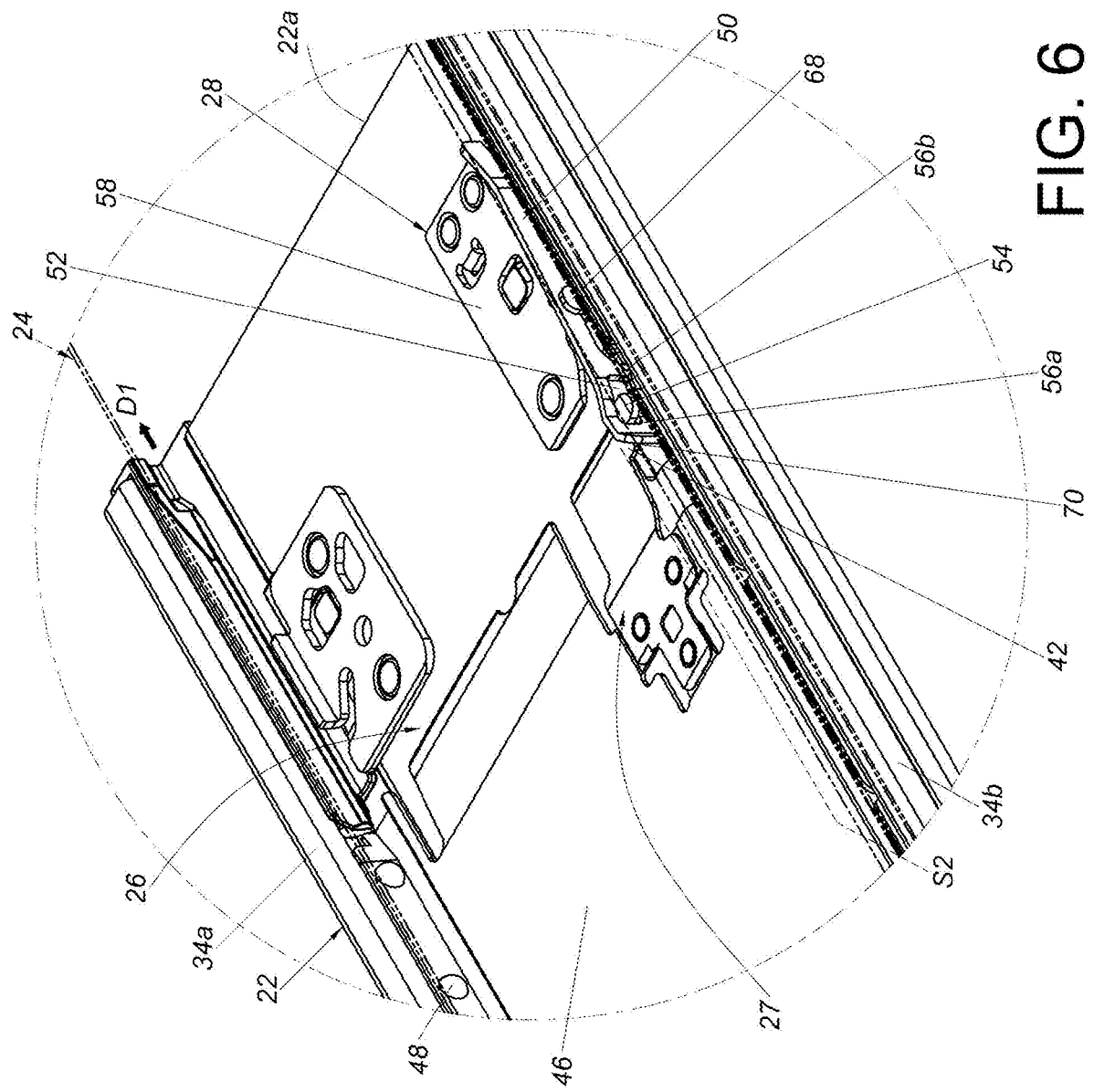
FIG. 6 is a diagram of the slide rail assembly as the second rail displaces relative to the first rail from a position as shown in FIG. 5 along the opening direction according to the embodiment of the present invention.

When the second rail 24 displaces relative to the first rail 22 along the opening direction D1 from a position as shown in FIG. 5 to a position as shown in FIG. 6, the guiding section 70 of the engaging feature 42 of the auxiliary member 27 can abut against the first guiding feature 64 of the resilient portion 50 of the retaining member 28 to drive the resilient portion 50 of the retaining member 28 to move from the first state S1 as shown in FIG. 5 to a second state S2 as shown in FIG. 6, such that the resilient portion 50 is resiliently deformed to accumulate a resilient force.

Figure 7:
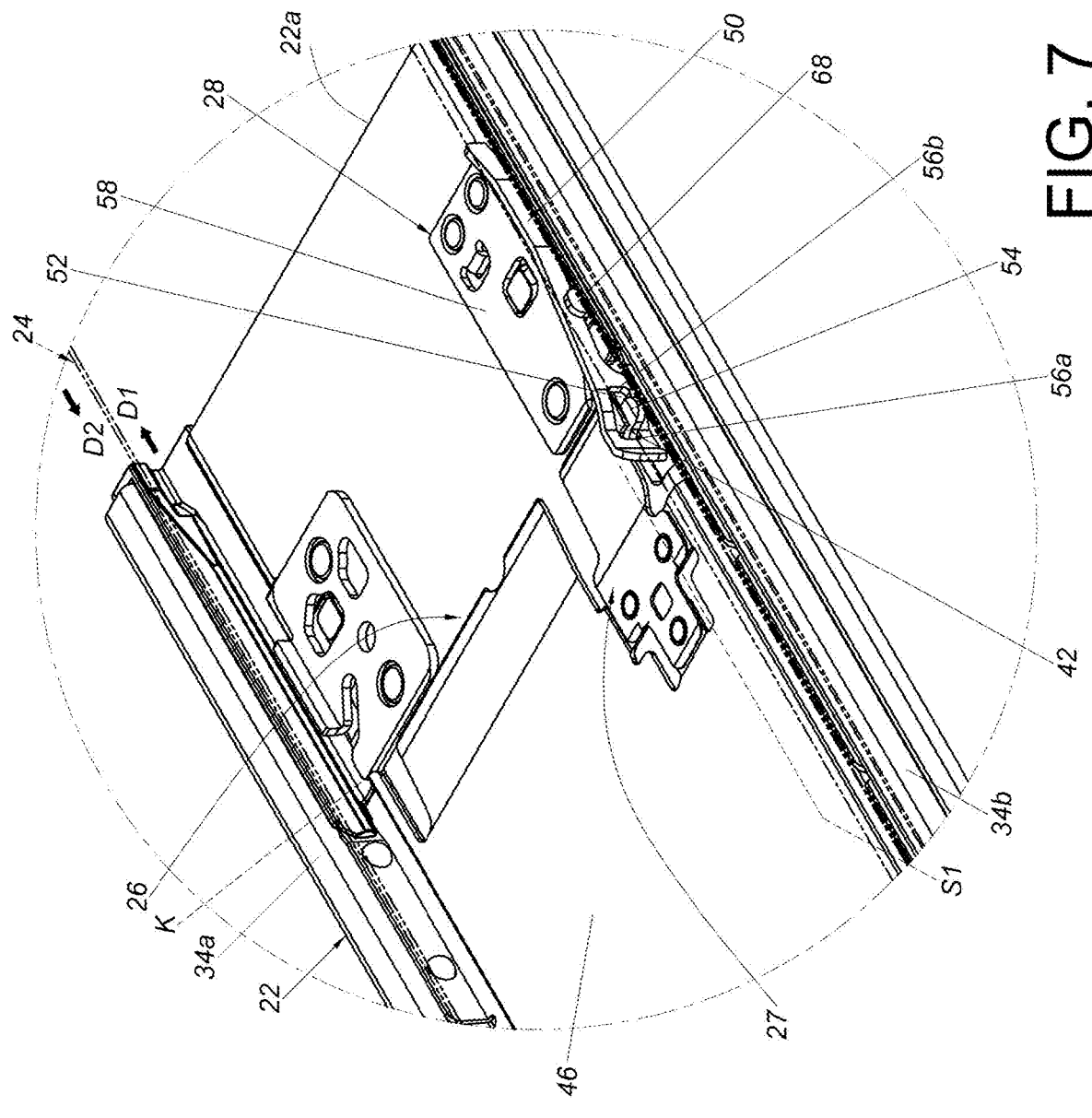
FIG. 7 is a diagram of the slide rail assembly as the second rail displaces relative to the first rail from a position as shown in FIG. 6 along the opening direction according to the embodiment of the present invention.
Figure 8:
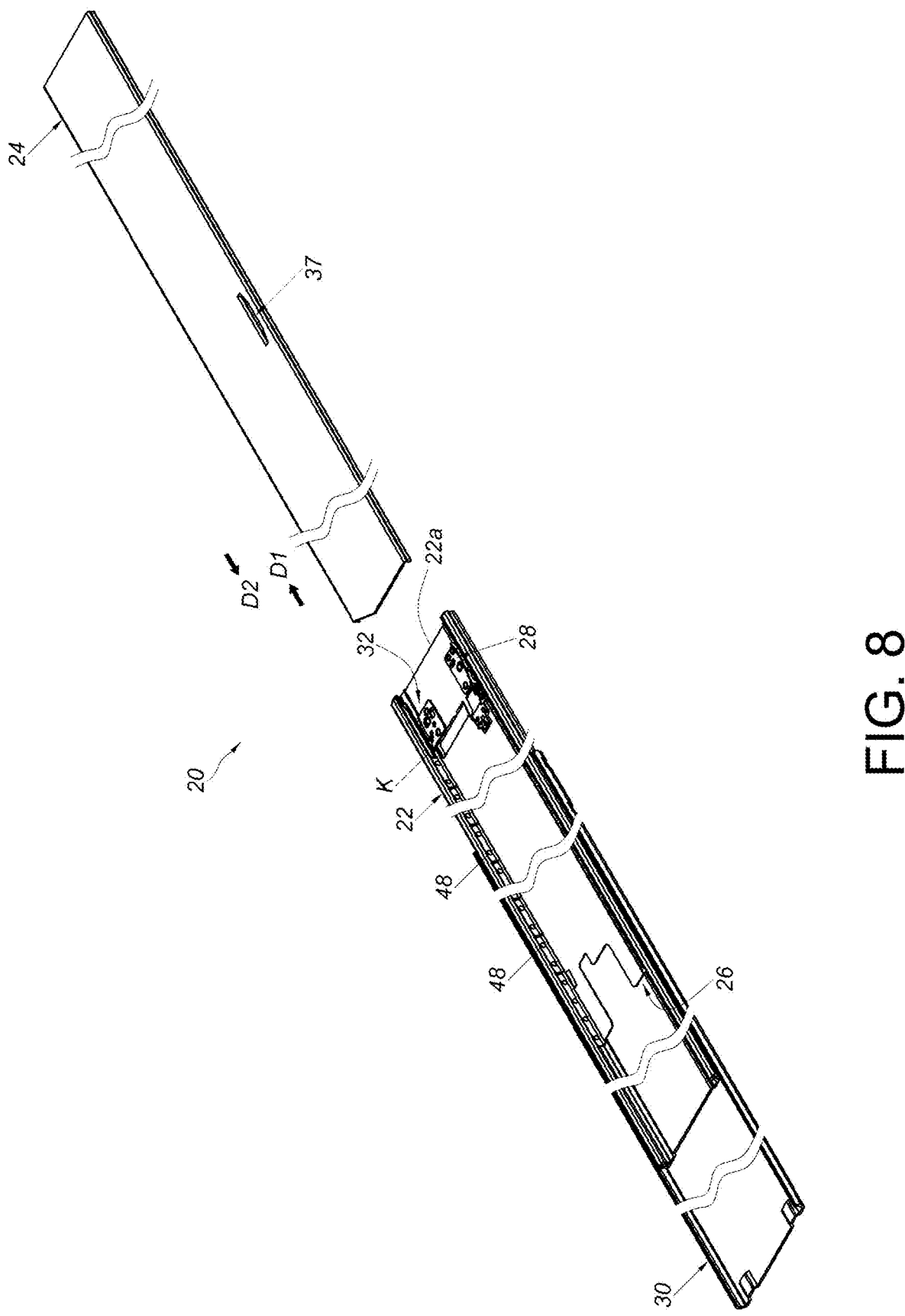
FIG. 8 is a diagram of the slide rail assembly as the second rail is detached from the first rail and the first rail is located an extended position relative to a third rail according to the embodiment of the present invention.

As shown in FIG. 7 and FIG. 8, when the second rail 24 is detached from the channel 32 of the first rail 22 by displacing relative to the first rail 22, the aiding-slide device 26 can move to a predetermined position K adjacent to the front end 22a of the first rail 22, and the engaging feature 42 of the auxiliary member 27 can engage with the predetermined feature 52 of the resilient portion 50 of the retaining member 28.

Specifically, as shown in FIG. 7, when the aiding-slide device 26 is located at the predetermined position K, the engaging feature 42 of the auxiliary member 27 is aligned with the predetermined feature 52 of the resilient portion 50, such that the resilient force of the resilient portion 50 is released to move the resilient portion 50 from the second state S2 to the first state S1, e.g., a locking state, and the engaging feature 42 of the auxiliary member 27 is stretched into the predetermined feature 52 of the resilient portion 50 of the retaining member 28 to abut against the first hole wall 56a for restraining the aiding-slide device 26 from displacing from the predetermined position K relative to the first rail 22 along a retracting direction D2 opposite to the opening direction D1, and/or to abut against the second hole wall 56b for restraining the aiding-slide device 26 from displacing from the predetermined position K relative to the first rail 22 along the opening direction D1. Besides, when the aiding-slide device 26 is located the predetermined position K and the engaging feature 42 engages with the predetermined feature 52 of the resilient portion 50 of the retaining member 28, the engaging feature 42 is configured to be offset from the restraining feature 54 transversely or laterally for preventing an interference between the engaging feature 42 and the restraining feature 54.

Figure 9:
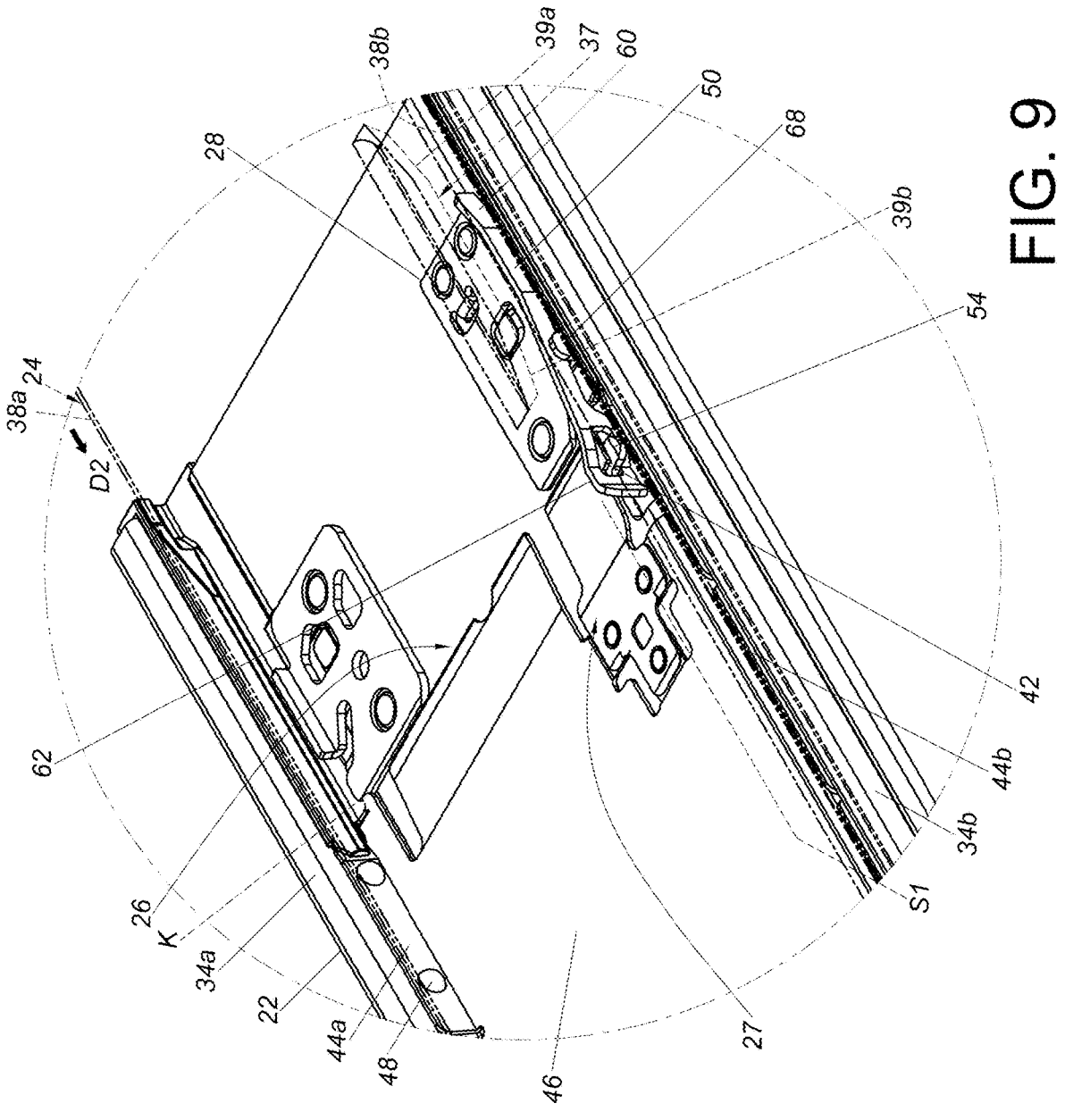
FIG. 9 is a diagram of the slide rail assembly as the second rail is inserted into a channel of the first rail from outside of the channel of the first rail according to the embodiment of the present invention.

As shown in FIG. 9, when the aiding-slide device 26 is located at the predetermined position K, the resilient portion 50 of the retaining member 28 is in the first state S1 to engage the predetermined feature 52 with the engaging feature 42 of the auxiliary member 27. Therefore, when the second rail 24 is inserted into the channel 32 of the first rail 22 by displacing along the retracting direction D2 from outside of the channel 32 of the first rail 22, the first wall 38*a* and the second wall 38*b* of the second rail 24 can be effectively supported by the rolling balls 48 on the first portion 44*a* and the second portion 44*b* of the aiding-slide device 26 at the predetermined position K for facilitating a stable and smooth insertion of the second rail 24 into the channel 32 of the first rail 22 along the retracting direction D2.

Figure 10:
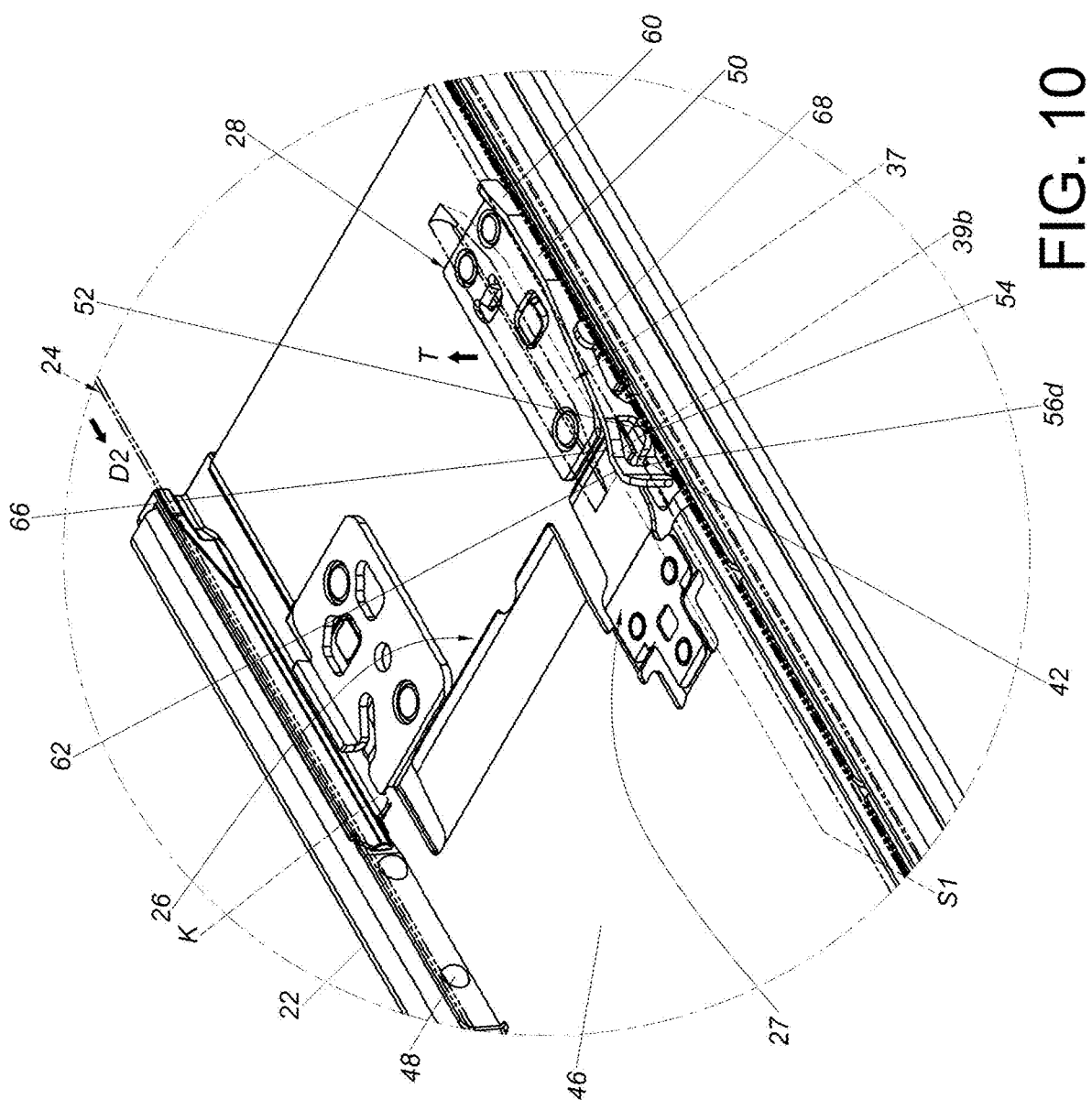
FIG. 10 is a diagram of the slide rail assembly as the second rail displaces relative to the first rail from a position as shown in FIG. 9 along a retracting direction according to the embodiment of the present invention.
Figure 11:
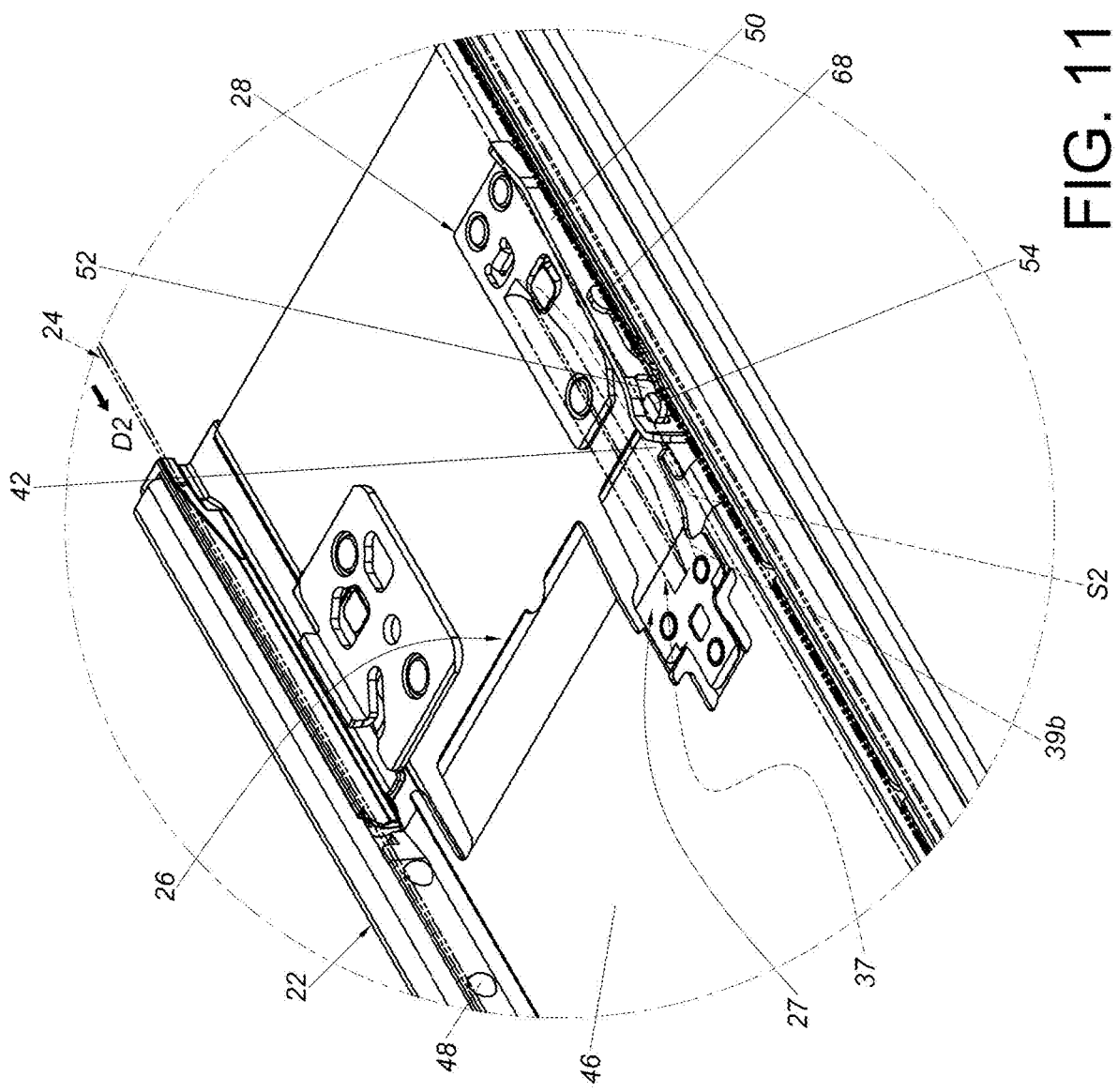
FIG. 11 is a diagram of the slide rail assembly as the second rail displaces relative to the first rail from a position as shown in FIG. 10 along the retracting direction according to the embodiment of the present invention.
Figure 12:
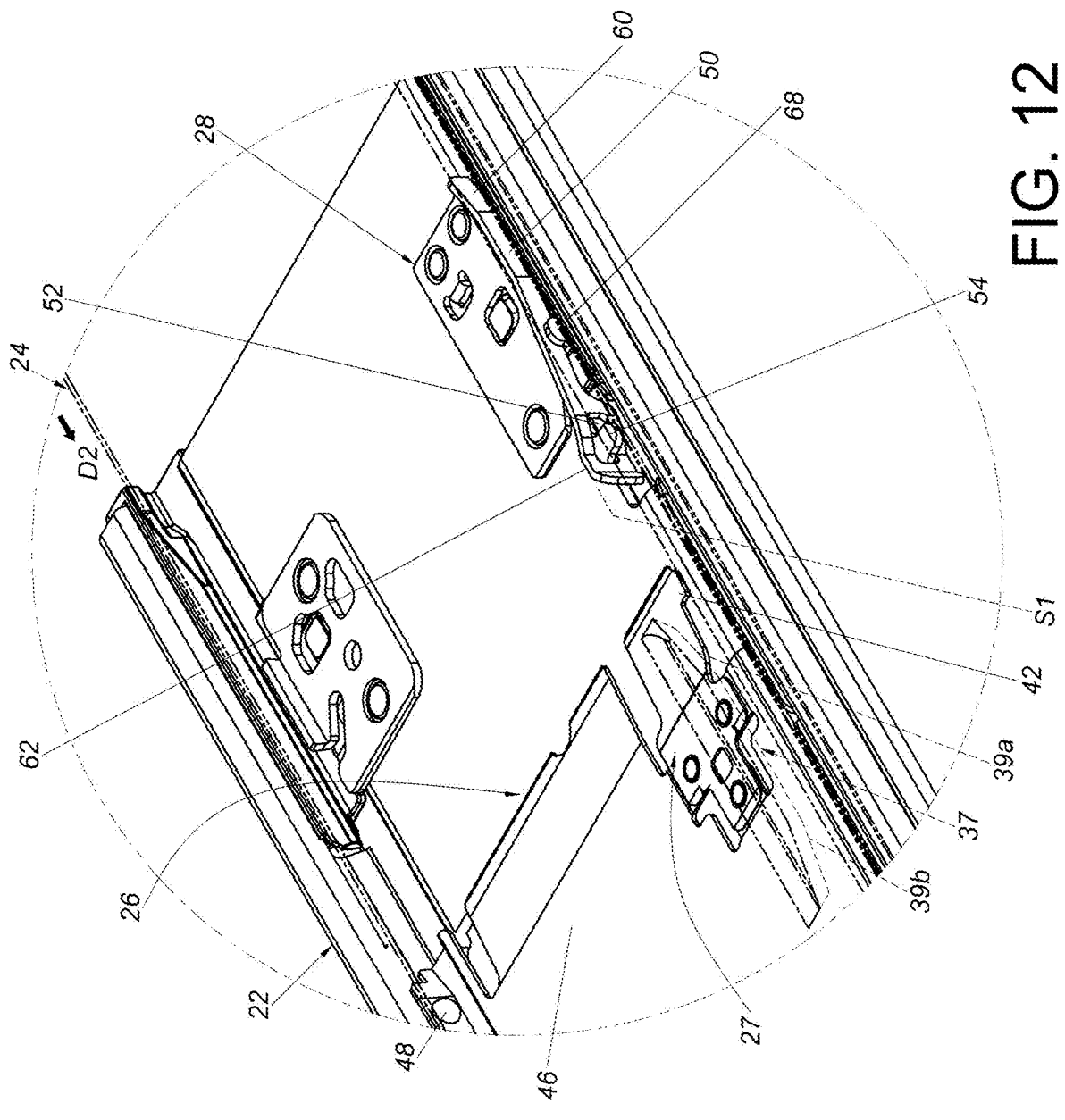
FIG. 12 is a diagram of the slide rail assembly as the second rail displaces relative to the first rail from a position as shown in FIG. 11 along the retracting direction according to the embodiment of the present invention.

As shown in FIG. 10, FIG. 11 and FIG. 12, when the second rail 24 further displaces relative to the first rail 22 from a position as shown in FIG. 9 along the retracting direction D2, the releasing feature 37 of the second rail 24 can drive the resilient portion 50 of the retaining member 28 to disengage the engaging feature 42 of the auxiliary member 27 from the predetermined feature 52 of the resilient portion 50 of the retaining member 28 for allowing the aiding-slide device 26 to displace from the predetermined position K along the retracting direction D2.

Specifically, when the second rail 24 displaces relative to the first rail 22 from a position as shown in FIG. 10 to a position as shown in FIG. 11 along the retracting direction D2, the second guiding structure 39*b* of the releasing feature 37 of the second rail 24 can abut against the second guiding feature 66 of the resilient portion 50 of the retaining member 28 to move the resilient portion 50 from the first state S1, e.g., the locking state, to the second state S2, e.g., an unlocking state, for disengaging the engaging feature 42 of the auxiliary member 27 from the predetermined feature 52 of the resilient portion 50 of the retaining member 28. At this moment, the resilient portion 50 is resiliently deformed to accumulate the resilient force. Afterwards, when the second rail 24 further displaces relative to the first rail 22 from the position as shown in FIG. 11 to a position as shown in FIG. 12 along the retracting direction D2, the aiding-slide device 26 can displace from the predetermined position K along the retracting direction D2 in response to a retracting movement of the second rail 24 and the resilient force of the resilient portion 50 can be released to move the resilient portion 50 from the second state S2 to the first state S1.

It should be noticed that, as shown in FIG. 10, a size of the predetermined feature 52 is greater than a size of the engaging feature 42. Specifically, a longitudinal dimension of the predetermined feature 52, e.g., the hole structure, is greater than a longitudinal dimension of the engaging feature 42, e.g., the engaging hook, for achieving a loose fit of the predetermined feature 52 and the engaging feature 42 to facilitate a disengagement of the engaging feature 42 and the predetermined feature 52. In other words, such configuration can prevent not only failure of the disengagement of the engaging feature 42 and the predetermined feature 52 but also deformation or damage of the engaging feature 42 and/or the second end section 62 of the resilient portion 50 due to a tight fit of the predetermined feature 52 and the engaging feature 42.

Furthermore, if there is an unintentional external force applied on the aiding-slide device 26 retained at the predetermined position K by the engagement of the engaging feature 42 and the predetermined feature 52, the engaging feature 42 may be pushed or pulled by the predetermined feature 52. At this moment, the material property of the auxiliary member 27 can enhance the structural strength or hardness to prevent or reduce damage of the aiding-slide device 26, so as to enhance reliability in operation of retaining the aiding-slide device 26 at the predetermined position K.

From the above, the slide rail assembly 20 according to the embodiment of the present invention includes the following characteristics.

1. In contrast to the prior art, the auxiliary member 27 having the engaging feature 42 is an independent member connected to the aiding-slide device 26 and made of the first material, and the aiding-slide device 26 is made of the second material, such that the reliability in operation of retaining the aiding-slide device 26 at the predetermined position K can be enhanced.

2. The aiding-slide device 26 includes the recessed portion 74 with the second surface 82 for allowing the connecting portion 76 of the auxiliary member 27 to be connected thereto, so as to reduce or eliminate the transverse difference between the surface 84 of the auxiliary member 27 and the first surface 80 of the aiding-slide device 26 when the auxiliary member 27 is connected to the aiding-slide device 26.

3. The first rail 22 includes the restraining feature 54 configured to prevent unintentional deformation, movement or bending of the resilient portion 50 for enhancing operational reliability.

4. The size of the predetermined feature 52 is greater than the size of the engaging feature 42 for facilitating the disengagement of the predetermined feature 52 and the engaging feature 42.

5. The main body portion 58 is integrally formed with the resilient portion 50 and the supporting section 68, such that the retaining member 28 is the one-piece structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly comprising:

a first rail comprising a channel;

a second rail movably mounted on the channel of the first rail and displaceable relative to the first rail longitudinally;

an aiding-slide device movably mounted between the first rail and the second rail;

an auxiliary member connected to the aiding-slide device, the auxiliary member comprising an engaging feature; and a retaining member arranged on the first rail, the retaining member comprising a resilient portion, and the resilient portion comprising a predetermined feature;

wherein the auxiliary member is made of a first material, and the aiding-slide device is made of a second material;

wherein when the second rail is detached from the channel of the first rail by displacing relative to the first rail along an opening direction, the aiding-slide device is located at a predetermined position by an engagement of the engaging feature of the auxiliary member and the predetermined feature of the resilient portion of the retaining member;

wherein the first rail further comprises a restraining feature configured to restrain the resilient portion from moving transversely, one of the predetermined feature and the restraining feature is an accommodating structure, and another one of the predetermined feature and the restraining feature is a protrusion configured to stretch into the accommodating structure.

2. The slide rail assembly of claim 1, wherein the aiding-slide device comprises a first end and a second end opposite to the first end, and the auxiliary member is connected to the aiding-slide device and located adjacent to the first end of the aiding-slide device.

3. The slide rail assembly of claim 2, wherein the first end and the second end of the aiding-slide device are a front end and a rear end of the aiding-slide device, respectively.

4. The slide rail assembly of claim 1, wherein the aiding-slide device comprises a recessed portion, the auxiliary member further comprises a connecting portion and an extending portion, the connecting portion is configured to be connected to the recessed portion, the extending portion extends from the connecting portion, and the engaging feature is arranged on the extending portion.

5. The slide rail assembly of claim 1, wherein the first material is carbon steel, and the second material is galvanized steel.

6. The slide rail assembly of claim 1, wherein the accommodating structure is a hole structure defined by a plurality of walls.

7. The slide rail assembly of claim 1, wherein the first rail further comprises a first wall, a second wall and a longitudinal wall connected between the first wall and the second wall of the first rail, the first wall, the second wall and the longitudinal wall of the first rail defines the channel of the first rail cooperatively, the retaining member further comprises a main body portion connected to the longitudinal wall of the first rail, and the resilient portion further comprises a first end section and a second end section, the first end section of the resilient portion is connected to the main body portion of the retaining member, and the predetermined feature is arranged on the second end section of the resilient portion.

8. The slide rail assembly of claim 7, wherein the second end section of the resilient portion comprises a first guiding feature and a second guiding feature, and the predetermined feature is arranged between the first guiding feature and the second guiding feature.

9. The slide rail assembly of claim 7, wherein the main body portion of the retaining member comprises a supporting section configured to support the resilient portion.

10. The slide rail assembly of claim 7, wherein the aiding-slide device further comprises a first portion, a second portion and a longitudinal portion connected between the first portion and the second portion of the aiding-slide device, the first portion, the second portion and the longitudinal portion of the aiding-slide device are located at positions corresponding to the first wall, the second wall and the longitudinal wall of the first rail, respectively, and a plurality of rolling balls are arranged on the first portion and the second portion of the aiding-slide device and configured to support the first wall and the second wall of the first rail.

11. The slide rail assembly of claim 10, wherein the engaging feature of the aiding-slide device is an engaging hook.

12. The slide rail assembly of claim 1, wherein the second rail comprises a releasing feature, when the second rail is inserted into the channel of the first rail along a retracting direction from outside of the channel of the first rail, the releasing feature of the second rail drives the resilient portion of the retaining member to disengage the engaging feature of the auxiliary member from the predetermined feature of the resilient portion of the retaining member for allowing the aiding-slide device to displace from the predetermined position along the retracting direction.

13. The slide rail assembly of claim 1, wherein a size of the predetermined feature is greater than a size of the engaging feature.

14. A slide rail assembly comprising:
a first rail comprising a first wall, a second wall and a longitudinal wall connected between the first wall and the second wall of the first rail, and the first wall, the second wall and the longitudinal wall defining a channel of the first rail cooperatively;
a second rail movably mounted on the channel of the first rail and displaceable relative to the first rail longitudinally;
an aiding-slide device movably mounted between the first rail and the second rail, the aiding-slide device comprising a first surface and a second surface, a transverse distance between the first surface and the longitudinal wall of the first rail being greater than a transverse distance between the second surface and the longitudinal wall of the first rail;
an auxiliary member connected to the aiding-slide device, the auxiliary member comprising an engaging feature, a connecting portion and an extending portion, the connecting portion being configured to be connected to the second surface, the extending portion extending from the connecting portion, and the engaging feature being arranged on the extending portion; and
a retaining member arranged on the longitudinal wall of the first rail, the retaining member comprising a resilient portion, and the resilient portion comprising an accommodating structure;
wherein the auxiliary member and the aiding-slide device are made of a first material and a second material, respectively;
wherein when the second rail is detached from the channel of the first rail by displacing relative to the first rail along an opening direction, the engaging feature of the auxiliary member stretches into the accommodating structure of the resilient portion of the retaining member to restrain the aiding-slide device from displacing relative to the first rail longitudinally;
wherein the longitudinal wall of the first rail comprises a protrusion configured to stretch into the accommodating structure, and the accommodating structure is a hole structure defined by a plurality of walls.

15. The slide rail assembly of claim 14, wherein a hardness of the first material is greater than a hardness of the second material.

16. The slide rail assembly of claim 14, wherein the retaining member further comprises a main body portion connected to the longitudinal wall of the first rail, the resilient portion comprises a first end section and a second end section, the first end section of the resilient portion is connected to the main body portion, and the accommodating structure is arranged on the second end section of the resilient portion.

17. The slide rail assembly of claim 16, wherein the second rail comprises a releasing feature, when the second rail is inserted into the channel of the first rail along a retracting direction from outside of the channel of the first rail, the releasing feature of the second rail drives the resilient portion of the retaining member to disengage the engaging feature of the auxiliary member from the accommodating structure of the resilient portion of the retaining member for allowing the aiding-slide device to displace from a predetermined position along the retracting direction.

\* \* \* \* \*